3,301,107
TOOL HOLDER
Stuart W. George, Grosse Pointe Farms, Mich., assignor to Federal-Mogul Corporation, a corporation of Michigan
Filed Sept. 2, 1964, Ser. No. 393,865
3 Claims. (Cl. 82—36)

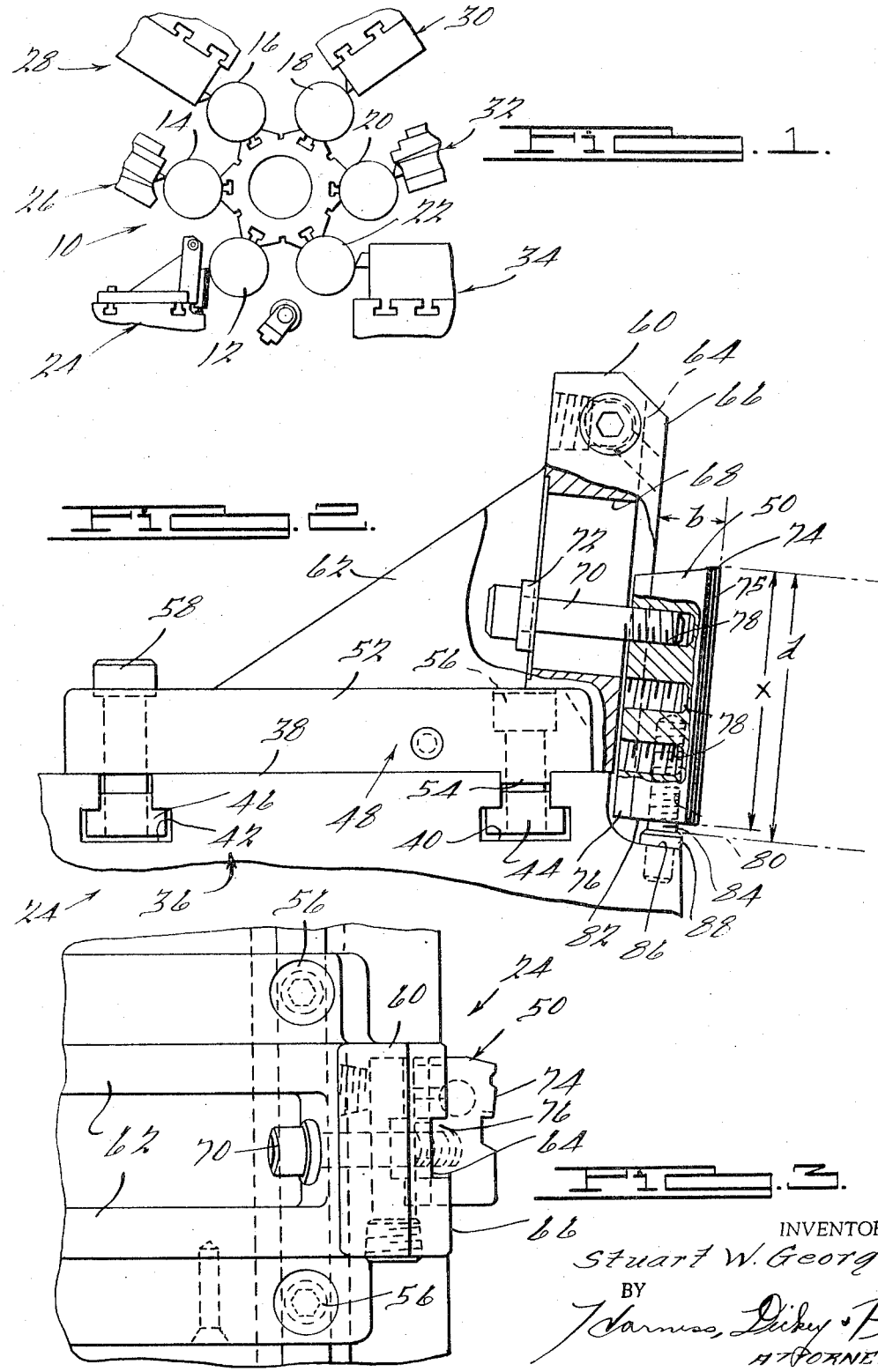

This invention relates to an improvement in tool holders and, more specifically, to tool holders for use with multiple spindle automatic bar machines.

Multiple spindle automatic bar machines are used for a variety of applications and possess the great advantage of being capable of performing several operations on a given workpiece without the necessity for externally transferring the part. The automatic bar machine commonly uses four, six, or eight spindles which rotate the workpiece at each of several work stations with the spindles and associated workpieces being automatically transferred from one work station to the next. At each work station is located a tool mounted on a slide which is movable relatively to the spindle at that station whereby the tool is brought into engagement with the workpiece to perform a particular cutting or forming operation. After the completion of an operation by each of the tools at each work station, the tool slides are retracted and the spindles and associated workpieces are indexed to their successive stations; the spindles rotate the workpieces and the tool slides are then moved toward the workpieces whereby the plurality of operation are again performed and the sequence is repeated.

With such a machine it is imperative that the tools be properly positioned. Normally the replacement of tools, as a result of wear, etc., requires a considerable down time for the machine. Such down time can be and often is quite costly. It is an object of the present invention to provide a novel tool holder and tool construction for use with a multiple spindle, automatic bar machine in which the time for tool replacement is a minimum.

With reference to the prior object it is a further object of this invention to provide a novel tool holder and tool in which increased tool life is realized.

With reference to the prior objects, it is another object of this invention to provide a novel tool holder and tool construction for use with an automatic bar machine in which the cutting edge of the tool can be preset relative to the tool holder whereby the tool can be quickly inserted and operation of the machine resumed.

It is still another general object of this invention to provide an improved tool holder and tool.

Other objects, features, and advantages of the present invention will become apparent from the subsequent description and the appended claims, taken in conjunction with the accompanying drawings, in which:

FIGURE 1 is a diagrammatic view of a multiple spindle automatic bar machine with a plurality of work stations each having a tool slide with a tool holder and tool inserted therein with the tool holder and tool of the present invention generally illustrated at one of these work stations;

FIGURE 2 is a side elevational view, with some parts broken away, depicting the tool holder and tool of the present invention in assembled relation with a tool slide; and FIGURE 3 is a fragmentary top elevational view of the apparatus of FIGURE 2.

Looking now to FIGURE 1 a spindle carrier for a multiple spindle automatic bar machine is generally indicated by the numeral 10 and includes a plurality of work spindles 12–22. The carrier 10 is indexed clockwise by a suitable mechanism moving the spindles 12–22 through successive work stations 24–34 while the individual spindles 12–22 are rotatable counterclockwise.

A tool or tools for performing selected operations is located at each of the work stations 24–34 on a tool slide or other type tool carrier. These tool slides or tool carriers are moved away from the work spindles 12–22 and move the associated tools out of engagement with the workpieces as the spindle carrier 10 is indexed. After the indexing, the tool slides or carriers are moved toward the workpieces and the tools carried thereby are brought into engagement with the workpieces which, at that time, are being rotated by their individual spindles, i.e., spindles 12–22.

With the multiple spindle machine, bar stock is carried by each of the spindles 12–22 and is normally fed into the spindles 12–22 at the work station 34 occupied by spindle 22 in the drawing and the finished part is cut off from the bar stock at the work station 32 occupied by spindle 20 in the drawing after the various operations at work stations 34 and 24–30. In setting up the multiple spindle machine all of the tools must be properly oriented in order that the operation to be performed thereby is done properly. Such a setup is normally quite time consuming. Once the machine has been set up the replacement of worn or broken tools under past practice is also quite time consuming. With the present invention setup time for a given part can be substantially reduced and the time for the replacement of worn tools is likewise substantially reduced. The present invention is generally illustrated in FIGURE 1 at work station 24 and is more specifically shown in FIGURES 2 and 3.

The work station 24 includes a tool slide 36 which is movable in translation toward and away from the workpiece held by that one of the spindles 12–22 at that station. The slide 36 has a flat upper surface 38 and a pair of laterally spaced T-shaped slots 40 and 42 extending generally transversely to the line of motion of the slide 36. T-shaped retainer bars 44 and 46 are located in slots 40 and 42, respectively, and serve a purpose to be presently seen.

A vertical tool holder 48 is located on the tool slide 36 and holds a cutting tool 50. The vertical tool holder 48 holds the tool 50 for movement in a direction generally vertically or normally relative to the direction of motion of the tool slide 36. The tool holder 48 has a flat base portion 52 with a projection 54 which is partially extensible within the forward slot 40. A plurality of bolts 56 extend through the base portion 52 and threadably engage the retainer bar 44 in the forward slot 40 while bolts 58 threadably engage the retainer bar 46 in rearward slot 42. Thus by tightening the bolts 56 and 58 the tool holder 48 can be clamped to the tool slide 36. The holder 48 can be positioned in a direction along the slots 40 and 42 by merely loosening the bolts 56 and 58. The tool holder 48 has an upwardly extending, forwardly inclining tool receiving portion 60 secured to the front end of the base portion 52. The tool receiving portion 60 is further supported on base portion 52 by a pair of transversely spaced, triangularly shaped ribs 62 which are connected between the rear surface of the tool receiving portion 60 and the base portion 52. The ribs 62 are located between the bolts 56 but are spaced sufficiently to permit access to the rear surface of the tool receiving portion 60. A groove 64 extends vertically, longitudinally through the forward face 66 of tool retainer portion 60 and is in direct alignment with a through slot 68. The slot 68 is of a width to receive a bolt 70 which extends therethrough with its head in engagement with the rear surface of the tool retainer portion 60 via a washer 72 and with its threaded shank in threaded engagement with the tool 50.

The tool 50 is generally rectangularly shaped and has a cutting edge 74 at its upper, forward surface. The tool 50 has a rearwardly extending tongue portion 76 of a reduced width which is located matingly in the groove 64 whereby the tool 50 is located in a fixed transverse position. The tool 50 has a plurality of longitudinally spaced threaded bores 78 which extend partially into the tool 50 through the tongue portion 76. The bolt 70 engages the upper one of the threaded bores 78 and holds the tool 50 against the forward surface 66 of the retainer portion 60 with the tongue portion 76 located within the groove 64. The position of the cutting edge 74 can be adjusted by loosening the bolt 70 and moving the tool 50 along the forward surface 66 of the tool retaining portion 60. The engagement of the tongue portion 76 with the side walls of the groove 64 prevents the tool 50 from turning about the axis of the bolt 70 when cutting forces are applied to the edge 74. In order to facilitate the accurate positioning of the cutting surface 74 means are provide to vertically locate the tool 50. The tool 50 has a threaded bore 80 extending partially upwardly from the bottom surface 82 and has threadably located therein a threaded adjustment bolt member 84. The forward, upper end of the tool slide 36 is transversely notched whereby the tool 50 can extend downwardly past the upper surface 38 and proximate to a locating surface 86. A hardened, locating button 88 is fixed at the surface 86 in a position in alignment with the adjustment bolt 84 such that the lowermost position of the tool 50 is determined by the engagement of the adjustment bolt 84 with the locating button 88. This lowermost portion also determines the position of the cutting edge 74. For machining a given part the dimension $d$ from the cutting edge 74 to the top of the locating button 88 or bottom of adjustment bolt 84 will be a preselected distance. By supporting the locating button 88 on the tool slide 36 rather than on the holder 48 variations due to any variations in the vertical position of tool holder 48 are eliminated. If the tool 50 is removed for resharpening, a portion of its upper surface will be removed and the distance from the cutting edge 74 to the bottom of adjustment bolt 84 will no longer be the desired distance $d$. The adjustment bolt 84, however, can be partially removed from bore 80 until the dimension $d$ has again been attained. In practice several tools, such as tool 50, would be maintained all having the proper dimensional relationship between cutting edge 74 and the bottom of the adjustment bolt 84. Thus when a tool, such as tool 50, is removed for sharpening another similar tool can be quickly inserted and located with the bottom surface of the adjustment bolt and top surface of the locating button in contact thereby properly locating the cutting edge and the machine can then be immediately put back into operation. In the meantime, the removed tool can be resharpened and the preselected distance $d$ to the cutting edge again re-established such that the resharpened tool can at an appropriate time be quickly installed back into the machine. As the tool 50 is sharpened its height gradually decreases until the adjustment bolt 70 is placed in the second threaded bore 78 and finally in the third one.

The tool 50 is of a uniform thickness selected to have its forward surface 75 always located at a preselected distance $b$ from the forward surface 66 of the tool retaining portion 60 such that the cutting edge 74 will always be at the same location regardless of the height $x$ of the tool 50. If the tools, such as tool 50, varied in width or in the dimension $b$ then the simple presetting procedures set forth could not be utilized.

Note that the forwardmost position of the tool slide 36 is preset within the multiple spindle machine such that the tool 50 will provide the proper cut on the workpiece. This latter position is fixed such that the only variable involved in replacing the tool 50 is in the replacement tool. Thus with the tool holder 48 and tool 50 as shown above the latter variable is eliminated and replacement time is substantially reduced.

The tool 50 utilizing the tongue portion 76 provides an advantage over similar tools formed with a dovetail portion. With tools of the latter type the dovetail portion is located with a dovetail groove formed in a vertical tool holder. With the dovetail construction the tool is held to the tool holder by clamping apparatus whereby the tapered sides of the dovetail portion are frictionally held against the mating sides of the tool holder. The clamping is normally effected by a bolt and other member in a manner such that the forces on the tool tend to pivot the tool and move the clamping apparatus apart; as the dovetail portion gets shorter in height the tendency to pivot increases and the tool becomes increasingly more difficult to hold. Thus, as the dovetail tool is reduced in height in resharpening when it reaches a length nearly equal to or less than the dovetail width it becomes very difficult to hold with a dovetail clamp under normal cutting forces. As the dovetail width will generally determine its strength, tools for heavier applications will have wider dovetails and will consequently have less usable length because of the potential loss of clamping effectiveness. In the present invention, the relatively narrower tongue portion 76 can be used effectively with a substantial range of tool widths. As a result of this, a tool with the dovetail portion cannot be cut down as far as the tool 50 with the tongue portion 76 and hence a tool constructed in the manner of the tool 50 will be usable for a longer time.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination with a multiple spindle automatic bar machine having a plurality of rotatable spindles and means for indexing the spindles to successive work stations, the improvement comprising: a tool slide located at one of the work stations and being movable towards and away from a workpiece being rotated by that one of the spindles at said one work station, a vertical tool holder having a generally, longitudinally vertically extending tool retaining portion having a longitudinally extending groove with generally parallel sides located on its forward surface, a cutting tool having a lower surface and an upper surface with a cutting edge across its width and having a preselected uniform thickness and being of the reusable type with said cutting edge being reestablished by removal of material from said upper surface, said tool having a rearwardly extending tongue portion of a reduced width and of a generally rectangular shape for fitting matably within said groove, said tool holder having a longitudinally extending slot in alignment with said groove, said tool having a plurality of longitudinally spaced threaded bores extending into said tongue portion, a bolt member having a shank extending through said slot, and threadably engaging a selected one of said threaded bores for clamping said tool to said tool retaining portion, a locating button on said tool slide in confrontation with said lower surface of said tool, a different bolt member threadably engageable with a threaded bore through said lower surface and selectively movable to predetermined positions and located in alignment with said locating button for engagement therewith with the distance between said cutting edge and said locating button determining the position of said cutting edge relative to the workpiece and whereby the latter position can be preset by selectively adjusting the extent that said different bolt member extends beyond said lower surface relative to said cutting edge.

2. In combination with a multiple spindle automatic bar machine having a plurality of rotatable spindles and means for indexing the spindles to successive work stations, the improvement comprising: a tool slide located at one of the work stations and being movable towards and away from a workpiece being rotated by that one of the spindles at said one work station, a vertical tool holder having a generally, longitudinally extending tool retaining portion having a longitudinally extending groove with generally parallel sides located on its forward surface, a cutting tool having a lower surface and an upper surface with a cutting edge across its width and having a preselected uniform thickness and being of the reusable type with said cutting edge being reestablished by removal of material from said upper surface, said tool having a rearwardly extending tongue portion of a reduced width and of a generally rectangular shape for fitting matably within said slot, means operative with said tool and on said tool holder for holding said tool to said tool holder, a locating button on said tool slide in confrontation with said lower surface of said tool, a bolt member threadably engageable with a threaded bore through said lower surface and selectively movable to predetermined positions and located in alignment with said locating button for engagement therewith with the distance between said cutting edge and said locating button determining the position of said cutting edge relative to the workpiece and whereby the latter position can be preset by selectively adjusting the extent that said bolt member extends beyond said lower surface relative to said cutting edge.

3. In combination with a multiple spindle automatic bar machine having a plurality of rotatable spindles and means for indexing the spindles to successive work stations, the improvement comprising: a tool slide located at one of the work stations and being movable towards and away from a workpiece being rotated by that one of the spindles at said one work station, a vertical tool holder secured to said tool slide, a cutting tool having a lower surface and an upper surface with a cutting edge and being of the reusable type with said cutting edge being reestablished by removal of material from said upper surface, means on said tool and on said tool holder for holding said tool to said tool holder and for locating said tool in a direction transversely to said direction of movement of said tool slide and for permitting selective up and down movement of said tool, said last named means including engaging means for engaging said tool at selected discrete positions on said tool, said engaging means including a bolt member and a plurality of vertically spaced threaded bores extending only partly through said tool with said tool being held to said tool holder by the threaded engagement of said bolt member with one of said threaded bores, a locating surface confronting said lower surface of said tool, a second bolt member threadably engageable with a different threaded bore through said lower surface and selectively movable to predetermined positions and located in alignment with said locating surface for engagement therewith with the distance between said cutting edge and said locating surface determining the position of said cutting edge relative to the workpiece and whereby the latter position can be preset by selectively adjusting the extent that said second bolt member extends beyond said lower surface relative to said cutting edge.

References Cited by the Examiner
UNITED STATES PATENTS

| | | | |
|---|---|---|---|
| 2,041,251 | 5/1936 | Klein | 82—35 |
| 2,188,198 | 1/1940 | Bredenbeck | 82—36 |
| 2,412,757 | 12/1946 | Smith | 82—35 |
| 2,810,188 | 10/1957 | Warner | 82—36 X |
| 3,158,053 | 11/1964 | Lange | 82—3 |

WILLIAM W. DYER, JR., *Primary Examiner.*

LEONIDAS VLACHOS, *Examiner.*